Feb. 27, 1968  C. R. DAILEY, JR  3,371,005
TIRE EXPANDERS AND METHOD OF MAKING SAME
Filed Sept. 27, 1963  2 Sheets-Sheet 1
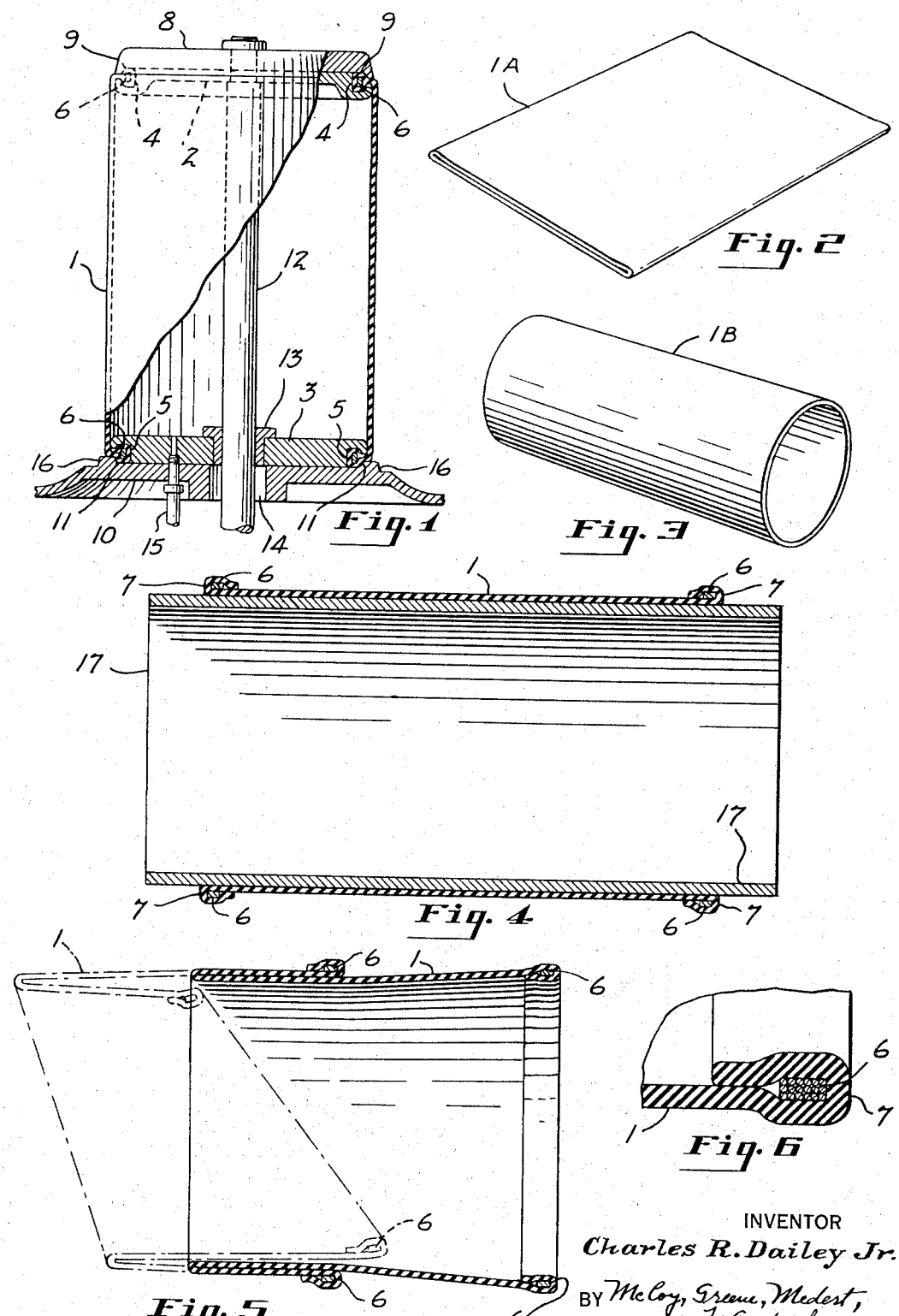
INVENTOR
Charles R. Dailey Jr.
BY McCoy, Greene, Medert, + Te Grotenhuis
ATTORNEYS INVENTOR
Charles R. Dailey Jr.

BY McCoy, Greene, Medert,
 & Te Grotenhuis
ATTORNEYS

# United States Patent Office 3,371,005
Patented Feb. 27, 1968

3,371,005
TIRE EXPANDERS AND METHOD
OF MAKING SAME
Charles R. Dailey, Jr., Cuyahoga Falls, Ohio, assignor to
The General Tire & Rubber Company, Akron, Ohio, a
corporation of Ohio
Filed Sept. 27, 1963, Ser. No. 312,189
4 Claims. (Cl. 156—416)

This invention relates to tire expanders of the type used to expand a substantially cylindrical drum built tire to toroidal form in a vulcanizing mold and to an improved method of making such expanders.

An expander of the type referred commonly comprises a molded and vulcanized elastic rubber diaphragm with a cylindrical expansible body and inturned beaded end portions that are clamped to rigid end closure disks; the external diameter of the expander being slightly less than the internal diameter of the tire to be expanded, and the length of the diaphragm being substantially the same as that of the cylindrical drum built tire to be expanded. The diaphragm of such expanders require frequent replacement due to deterioration of the rubber due to repeated heating while under tension and the cost of such individually molded and vulcanized diaphragms is a substantial item in the cost of making a tire.

The present invention provides an expander and a method of making the same which greatly reduces the cost of the expanders by eliminating the molding and vulcanizing of individual diaphragms. In constructing the expanders by the method of the present invention vulcanized tubing of uniform section and indeterminate lenght is cut to lengths suitable for the diaphragms and the lengths of tubing which form the diaphragms of the expanders are assembled with the end closure disks and are connected to the disks to provide fluid tight seals by simple fabricating operations which can be quickly and easily performed manually thereby eliminating the costly vulcanizing molds required for the making of individually vulcanized diaphragms and the cost of operation of such molds.

In the accompanying drawings:

FIGURE 1 is a fragmentary vertical view showing an expander that embodies the invention mounted on the lower section of a tire-vulcanizing mold.

FIGURES 2 and 3 are perspective views of lengths of extruded and vulcanized tubing cut to a proper length to form the elastic diaphragm of the expander. FIG. 2 shows tubing that is extruded and vulcanized to a transversely flat cross-section. FIG. 3 shows a section of cylindrical tubing.

FIGURES 4 and 5 illustrate the method of forming the expander shown in FIG. 1. FIG. 4 shows the initial step of folding the ends of the vulcanized rubber tubing over bead rings on the exterior of the tubing. FIG. 5 shows the step of turning the tubing inside out to bring the bead rings to the interior of the tubing.

FIGURE 6 is a fragmentary section on an enlarged scale showing the bead rings positioned interiorly of the tubing.

FIGURES 7 to 10 inclusive illustrate a modified form of expander and the method of making.

Figure 7:
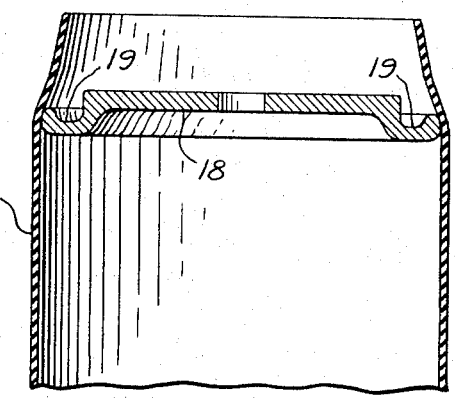
FIGURE 7 shows a closure disk having an external circumference greater than the circumference of the tubing so that after the disk is placed within an end portion of the tubing the portion of the tubing projecting beyond the closure disk tapers radially inwardly.

In the drawings the elastic rubber diaphragm is designated throughout by the numeral 1; either a length of flat vulcanized tubing 1A such as shown in FIGURE 2 or a length of cylindrical vulcanized tubing 1B such as shown in FIGURE 3 may be used as the diaphragm. The diaphragm 1 is attached at the ends to an upper end closure disk 2 and a lower end closure disk 3, said disks being provided on their exterior faces with annular bead seating recesses 4 and 5, respectively. Bead rings 6 are disposed interiorly of the diaphragm and are of a diameter to be received with the end portions 7 of the diaphragm wrapped around them in the recesses 4 and 5. The ends 7 of the diaphragm with the bead rings 6 about which they are wrapped provide beads that fit in the recesses 4 and 5. A clamping plate 8 is provided to clamp the upper beads to the recessed seat 4 of the upper closure disk and form a fluid tight seal; this plate being provided with an annular bead retaining shoulder 9 that surrounds the beads to retain them in the recess 4. The lower closure disk 3 similarly is secured by means of a clamping member that may be the lower mold section of a tire vulcanizing mold, the member 10 being provided with an annular bead retaining shoulder 11 that engages the beads exteriorly to retain them in the recess 5.

When used to expand a tire into a vulcanizing mold, the tire end closures are moved one toward the other while the tire is being expanded by suitable means such as a piston rod 12 coaxial with the diaphragm and attached to the upper closure disk 2 and plate 8. The piston rod 12 may be guided by a bushing 13 in the lower disk 3 and passes through an opening 14 in the lower mold section 10. Fluid under pressure may be admitted to or exhausted from the interior of the expander through a suitable conduit 15 attached to the mold section 10.

When unexpanded the diameter of the diaphragm is but slightly less than the diameter of the tire beads which interiorly engage an annular bead seat 16 on the lower mold section 10.

Vulcanized molds are commonly provided with upper and lower sections which have their opposite faces recessed to form a mold cavity when closed that conforms to the exterior of a pneumatic tire which is to be shaped and vulcanized therein. The upper section is positioned above the expander and is moved downwardly while the expander is subjected to internal fluid pressure against the interior of a drum-built tire supported on the bead seat 16 of the lower mold section 10. The upper section of the mold 8 and the upper end of the expander 2 are moved downwardly during the closure of the mold so that the tire to be vulcanized is expanded into full engagement with the walls of the mold cavity after which heat is applied by heated fluid under pressure within the expander and in some instances by heat applied to the mold sections. After the vulcanizing operation, the mold is opened and the expander is deflated and extended to the position shown in FIG. 1 to permit removal of the vulcanized tire from the mold.

In forming the diaphragm 1 shown in FIG. 1, the bead rings 6 are placed around end portions of the tubing and the end portions 7 of the tubing are turned back over the exterior of the bead rings. This can be done in any suitable manner, such as by placing the tubing on a cylindrical mandrel 17, slipping the beads over the ends and turning the ends back as shown in FIG. 4. After this, the bead rings are brought to the interior of the tubing by turning the tube inside out as illustrated in FIG. 5. The passage of one bead ring through the other is accomplished by positioning the bead ring that is passed through the tubing at an acute angle to the axis of the tube and flattening the outer ring to permit passage of the inner ring through it. The bead rings are inextensible but have sufficient flexibility to permit distortion necessary for the turning of the tubing inside out. The end portion 7 of the tubing may be cemented to the tubing axially inwardly of the beads to more securely hold the beads during the turning operation.

FIGS. 7 to 10 inclusive show an end closure disk 18 with a circumference greater than that of the vulcanized tubing and having an annular recessed bead seat 19 into which fits the bead ring 20 with portions of the tube 21 wrapped around it, the diaphragm beads so formed are retained in place by means of the clamping plate 22 which is secured to the closure disk 18.

Figure 8:
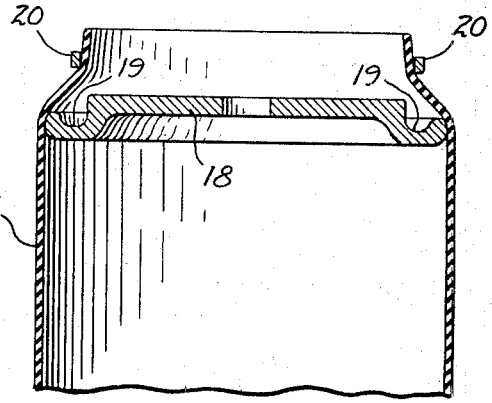
FIGURE 8 shows a bead ring applied to the projecting end of the tubing.
Figure 9:
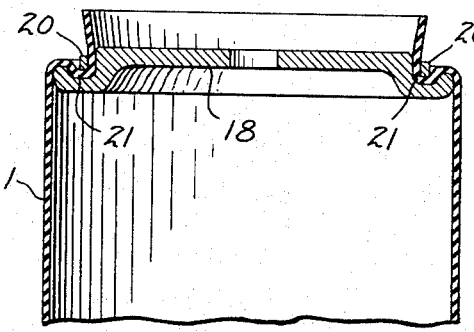
FIGURE 9 shows the bead ring pressed axially inwardly against an annular seat on the outer face of the closure disk.
Figure 10:
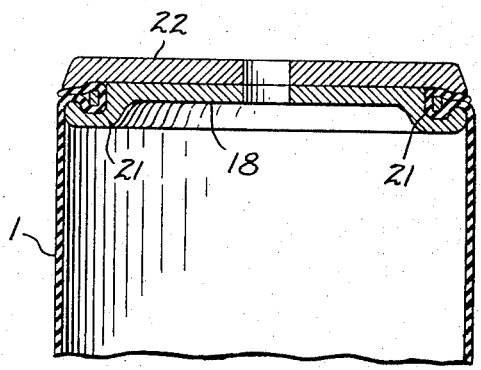
FIGURE 10 shows the bead ring and the folded back portion of the tubing clamped against the annular seat in the outer face of the closure disk.

The ends of diaphragm 1 may be wrapped about the bead rings 20 and attached to the closure disk 18 as illustrated in FIGS. 7 to 10 inclusive. The closure disk 18 which is of a diameter greater than the normal diameter of the tubing is placed inside the tubing and is brought to a position perpendicular to the axis of the tubing (FIG. 7). This causes the tube to be stretched over the periphery of the disk and to taper inwardly. A bead ring of the proper diameter to be received in the annular recess 19 is then slipped over the tapering end of the tube as shown in FIG. 8 and pressed into the recessed seat 19 as shown in FIG. 9 after which the end of the tube is turned back over the exterior of the bead ring and clamped between the clamping plate 22 and the closure disk 18 shown in FIG. 10. The outturned end of the tubing and the inturned portion extending from the bead recess 19 are clamped between an annular shoulder of the clamping plate 22 and the marginal portion of the outer face of the disk 18 to insure a fluid-tight seal. It is to be understood that the opposite end of the disk may be clamped to the closure disk at the opposite end of the expander in the same manner as shown in FIG. 10.

Figure 11:
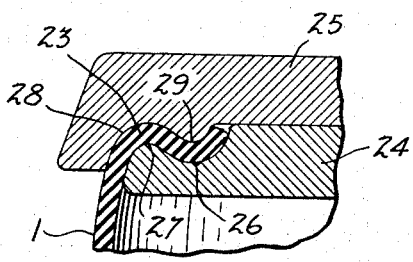
FIGURE 11 is a fragmentary view showing a modified form of expander.
Figure 12:
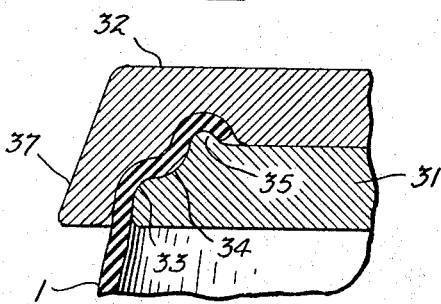
FIGURE 12 is a fragmentary section showing another modified form of the expander.

FIGS. 11 and 12 show modified forms of fluid tight attachments for the ends of the tubular diaphragms. In FIG. 11 the end 23 of the diaphragm 1 is shown clamped between a closure disk 24 and a clamping plate 25 to form a fluid-tight seal. The closure disk 24 has an annular, transversely arcuate recess 26 in its outer face and an annular shoulder 27 forming the margin of the external face of the disk 24; while the clamping plate 25 also has a transversely arcuate recess that overlies the aforementioned annular shoulder 27 and a rounded rib 29 overlying the recess 26 of the disk 24.

In FIG. 12 an inturned end portion of the elastic tubing is clamped between a closure disk 31 and a clamping plate 32. The closure disk has a marginal rounded shoulder 33, an inwardly tapering portion axially outwardly of the shoulder 33 in which there is a transversely arcuate, annular recess 34. A rounded axially projecting rib 35 is provided at the inner side of the recess 34. The clamping plate 32 has a marginal flange 37 that overlies the marginal portion of the closure plate 31 and that has an inner face provided with a tube engaging surface that is disposed in substantially parallel relation to the tube engaging face portions of the closure disk for clamping the inturned end portion of the tube in order to provide a fluid-tight seal.

What is claimed is:

1. The method of making a tire expander in which a tubular elastic rubber diaphragm is secured at each end to a rigid end closure disk which comprises placing a disk within each end portion of a tubular elastic rubber diaphragm cut to a predetermined length from vulcanized tubing that is of uniform section and indeterminate length, and forming a fluid-tight connection between the ends of said diaphragm and the said disks by clamping the ends of the tube to the peripheral portions of said disks, the ends of said diaphragms being wrapped about inextensible bead rings of less diameter than said disks, the bead rings with the tube ends wrapped around them being clamped to the outer faces of the disks, each bead ring being first positioned around the exterior of the diaphragm and the end of the diaphragm being folded back over the bead ring after which the diaphragm is turned inside out to bring the bead ring to the interior thereof.

2. In a vulcanizing mold having a lower mold section to support an uncured drum-built rubber tire and a tire expander mounted on said mold section, said expander having a pair of aligned circular end closure disks, means for moving said disks axially toward and away from each other comprising a central piston rod extending through said mold section and the lower end closure disk and connected to the upper end closure disk, and means for inflating and expanding said tire to a toric shape in the mold and for maintaining pressure in the tire to maintain said shape as the tire is heated and vulcanized in the mold, the combination therewith of a tubular diaphgram in the form of a length of vulcanized elastic rubber tubing that is normally of uniform perimeter and uniform wall thickness throughout its length, said tubing having a perimeter less than that of said end closure disks and having its opposite end portions stretched over said disks, and means clamping said last-named end portions against the axially outer faces of said disks to provide fluid-tight connections between the disks and the diaphragm, whereby said expander may be inflated, the lower end closure disk being rigidly mounted on said lower mold section to provide the means for clamping the lower end portion of said diaphragm, the upper end closure disk having a clamping plate rigidly mounted thereon to provide the means for clamping the upper end portion of said diaphragm, said upper disk having a rounded annular shoulder at its margin, a rounded axially projecting annular shoulder on its outer face spaced inwardly from said margin, and an annular recess between said shoulders, the upper end portion of said diaphragm engaging said shoulders and said recess and terminating at the radially inner side of said axially projecting shoulder, said clamping plate having an axially projecting marginal flange overlying the marginal portion of said upper disk and conforming generally to the shape of said shoulders and said recess.

3. In a vulcanizing mold having a lower mold section to support an uncured drum-built rubber tire and a tire expander mounted on said mold section, said expander having a pair of aligned circular end closure disks, means for moving said disks axially toward and away from each other comprising a central piston rod extending through said mold section and the lower end closure disk and connected to the upper end closure disk, and means for inflating and expanding said tire to a toric shape in the mold and for maintaining pressure in the tire to maintain said shape as the tire is heated and vulcanized in the mold, the combination therewith of a tubular elastic rubber diaphragm in the form of a length of rubber tubing that is normally of uniform perimeter and uniform wall thickness throughout its length, said tubing having a perimeter less than that of said end closure disks and having its opposite end portions stretched and wrapped around a pair of removable bead rings with a diameter less than that of said disks, and means clamping said last-named end portions against the axially outer faces of said disks to provide fluid-tight connections between the disks and the diaphgram, whereby said expander may be inflated, the lower end closure disk being rigidly mounted on said lower mold section to provide the means for clamping the lower end portion of said diaphragm, the upper end closure disk having a clamping plate rigidly mounted thereon to provide the means for clamping the upper end portion of said diaphragm, each of said disks having a rounded annular shoulder at its margin and an annular recessed bead seat at the inner edge of said shoulder, the end portion of said rubber tubing being stretched over said annular shoulder, extending inwardly between its associated bead ring and the bottom of said recessed bead seat, being turned back upon itself so that it extends axially outwardly at the inner side of said bead seat and the inner face of the bead ring and radially outwardly over the axially outer face of the bead ring, and being clamped in said bead seat against the end closure disk and the axially inner and outer faces of the bead ring.

4. In a vulcanizing mold having a lower mold section to support an uncured drum-built rubber tire and a tire expander mounted on said mold section, said expander having a pair of aligned circular end closure disks, means for moving said disks axially toward and away from each other comprising a central piston rod extending through said mold section and the lower end closure disk and connected to the upper end closure disk, and means for inflating and expanding said tire to a toric shape in the mold and for maintaining pressure in the tire to maintain said shape as the tire is heated and vulcanized in the mold, the combination therewith of a tubular diaphragm in the form of a length of vulcanized elastic rubber tubing that is normally of uniform perimeter and uniform wall thickness throughout its length, said tubing having a perimeter less than that of said end closure disks and having its opposite end portions stretched over said disks, and means clamping said last-named end portions against the axially outer faces of said disks to provide fluid-tight connections between the disks and the diaphragm, whereby said expander may be inflated, the lower end closure disk being rigidly mounted on said mold section to provide the means for clamping the lower end portion of said diaphragm, the upper end closure disk having a clamping plate rigidly mounted thereon to provide the means for clamping the upper end portion of said diaphragm, said upper disk having a rounded annular shoulder at its margin, an annular shoulder on its outer face spaced inwardly from said margin, and a rounded annular recess between said shoulders, said clamping plate having an axially projecting marginal flange overlying the marginal portion of said upper disk and clamping the upper end portion of said diaphragm against said recess and said rounded shoulder, said flange conforming generally to the shape of said rounded shoulder and said recess an having a single rounded axially projecting annular shoulder for clamping said upper end portion in said recess.

References Cited
UNITED STATES PATENTS

| | | | |
|---|---|---|---|
| 2,495,663 | 1/1950 | Soderquist | 156—125 |
| 1,789,143 | 1/1931 | Kraft | 156—416 |
| 2,084,009 | 6/1937 | Sohl | 156—416 |
| 2,871,912 | 2/1959 | Kraft | 156—126 |
| 2,936,813 | 5/1960 | Haase | 156—126 |
| 3,030,252 | 4/1962 | Edgerly et al. | 156—132 |
| 3,035,629 | 5/1962 | Vanzo et al. | 156—416 X |
| 3,061,499 | 10/1962 | Slemmons et al. | 156—132 X |
| 3,154,455 | 11/1964 | Nebout | 156—133 X |

EARL M. BERGERT, *Primary Examiner.*

CLIFTON B. COSBY, *Examiner.*